UNITED STATES PATENT OFFICE 1,985,900

COMPOSITION FOR PREVENTING SILVER FROM TARNISHING

Israel S. Kleiner, Brooklyn, N. Y.

No Drawing. Application February 27, 1932, Serial No. 595,667

4 Claims. (Cl. 23—5)

This invention relates to a new composition of matter and method of making the same and has for its object, the production of a compound which will prevent metals, such as silver, iron or others from tarnishing or oxidizing.

A further object of the invention includes the production of a de-hydrating compound which will efficiently and economically desiccate the atmosphere immediately surrounding the metal that is to be kept from tarnishing and will render innocuous certain tarnishing agencies such as hydrogen sulfide, sulphur dioxide and carbon dioxide which are commonly present in the atmosphere in more or less varying proportions.

Another object includes the production of coated anhydrous metallic salts and method of making the same.

It is known that tarnishing is caused by the action of hydrogen sulfide, sulphur dioxide and carbon dioxide commonly present in the atmosphere whenever these gases are brought in contact with moisture in the atmosphere. It is my purpose, therefore, to provide agencies which will remove moisture from the atmosphere so as to render ineffective said tarnishing agencies. I, therefore provide in a specific application of my invention, a mixture of anhydrous calcium chloride and anhydrous copper sulfate and coat the same with a powdery coating, such as talc to thereby prevent the chloride and the sulfate from crusting and adhering together in lumps. This composition has great affinity for water and will remove moisture from the air, thus rendering ineffective the tarnishing agencies. After the composition has removed the water and has become a liquid, it still possesses anti-tarnishing properties for the following reasons:

1. In the presence of moisture the calcium chloride will unite with carbon dioxide and sulphur dioxide, thus removing these agencies from the air. Silver reacts best with hydrogen sulfide in the presence of acid. This property of calcium chloride thus hinders carbon dioxide, hydrogen sulfide and sulphur dioxide from acting on the silver.

2. Copper sulfate also may unite with hydrogen sulfide and carbon dioxide forming an affinity similar to silver for these agencies. Since it is in solution it will tend to act more promptly than the silver.

Another advantage of this composition, is that the liquefication thereof will warn the user that its effectiveness is waning and that the material should be replenished. It therefore serves as a visual index. The proportions to be used will depend somewhat upon the composition of the atmosphere. If there is a larger percentage of hydrogen sulfide than is ordinarily found, the proportion of the copper sulfate must be increased. On the other hand, if sulphur dioxide predominates, calcium chloride should be increased. The amount of the coating material which may be talc, is graded according to the size of the particles of calcium chloride which should not exceed one-quarter of an inch in diameter. While the proportions of the calcium chloride, copper sulfate and the powdered talc vary, I find the following parts, by weight, to give excellent results.

| | Parts |
|---|---|
| Granular, anhydrous calcium chloride | 88 to 94.9 |
| Pulverized anhydrous copper sulphate | 5 to 10 |
| Talc | 0.1 to 2 |

The method of preparing the material is as follows: anhydrous copper sulfate in powdered form and anhydrous granular calcium chloride are mixed in a closed vessel until the powdered copper sulfate has thoroughly penetrated the pores of the calcium chloride particles. This mixture is then coated with a suitable powdery substance such as talc. This coating will adhere to the granules of the anhydrous mixture and will completely cover the same. When thus fully coated, the articles will not freeze together or form a hardening crust.

While I have named specific dehydrating agents, it is obvious that other dehydrating agents, besides calcium chloride or copper sulfate may be used, likewise other coating materials besides talc, may, in some instances, be preferred.

The mixture is packed in air-tight containers which are preferably wide mouth glass jars. When in use, the top is removed and the jar placed in the cabinet, show-case or other receptacle containing silver and other metal ware.

Having now described my new invention, what I seek to secure by United States Letters Patent is:

1. The method of making an antitarnish composition which consists in impregnating solid porous lumps of a deliquescent anhydrous dehydrating material having an affinity for carbon dioxide with solid particles of another and different anhydrous dehydrating material, having an affinity for hydrogen sulfide, in a dry state and finely enough divided to penetrate the pores of said lumps.

2. The method of making an antitarnish composition which consists in impregnating solid porous lumps of anhydrous calcium chloride with solid particles of anhydrous copper sulphate in a dry state and finely enough divided to penetrate the pores of said lumps.

3. The method of making an antitarnish composition which consists in impregnating solid porous lumps of anhydrous calcium chloride with solid particles of anhydrous copper sulphate in a dry state and finely enough divided to penetrate the pores of said lumps, and coating said impregnated lumps with a powdered inert material.

4. A composition for preventing metals from tarnishing which consists in solid lumps of a porous deliquescent anhydrous dehydrating material having an affinity for carbon dioxide, the pores of which are heterogeneously impregnated with pulverized solid particles of another and different anhydrous dehydrating material, having an affinity for hydrogen sulfide, finely enough divided to penetrate the pores of said lumps and uniformly distributed in said pores.

ISRAEL S. KLEINER.

CERTIFICATE OF CORRECTION.

Patent No. 1,985,900.  January 1, 1935.

ISRAEL S. KLEINER.

It is hereby certified that error appears in the printed specification of the above numbered patent requiring correction as follows: Page 2, second column, line 10, claim 4, for "uniformly" read ununiformly; and that the said Letters Patent should be read with this correction therein that the same may conform to the record of the case in the Patent Office.

Signed and sealed this 5th day of March, A. D. 1935.

Leslie Frazer (Seal)  Acting Commissioner of Patents.